United States Patent
Elder

(10) Patent No.: US 8,816,600 B2
(45) Date of Patent: Aug. 26, 2014

(54) METHOD OF POWER AND TEMPERATURE CONTROL FOR HIGH BRIGHTNESS LIGHT EMITTING DIODES

(75) Inventor: Joseph Scott Elder, Chandler, AZ (US)

(73) Assignee: NXP B.V., Eindhoven (NL)

( * ) Notice: Subject to any disclaimer, the term of this patent is extended or adjusted under 35 U.S.C. 154(b) by 448 days.

(21) Appl. No.: 13/288,379

(22) Filed: Nov. 3, 2011

(65) Prior Publication Data

US 2012/0286694 A1  Nov. 15, 2012

Related U.S. Application Data

(60) Provisional application No. 61/486,202, filed on May 13, 2011.

(51) Int. Cl.
 *H05B 33/08* (2006.01)

(52) U.S. Cl.
 CPC .......... *H05B 33/0818* (2013.01); *Y02B 20/347* (2013.01)
 USPC ............................ 315/291; 315/224; 315/309

(58) Field of Classification Search
 CPC .... Y02B 20/30; Y02B 20/341; Y02B 20/346; Y02B 20/347; H05B 37/00; H05B 37/02; H05B 33/00; H05B 33/02; H05B 33/08; H05B 33/0806; H05B 33/0815; H05B 33/0818; H05B 33/0824; H05B 33/0833
 USPC .......................... 315/291, 307, 308, 309, 224
 See application file for complete search history.

(56) References Cited

U.S. PATENT DOCUMENTS

| | | | |
|---|---|---|---|
| 7,808,284 B2 | 10/2010 | Yoshimitsu | |
| 7,812,551 B2 * | 10/2010 | Hite et al. | 315/291 |
| 7,977,890 B2 | 7/2011 | Keizo | |
| 8,334,662 B2 * | 12/2012 | Jin et al. | 315/299 |
| 8,410,716 B2 | 4/2013 | Kaiwei | |
| 8,716,947 B2 | 5/2014 | Elder | |
| 2004/0164685 A1 | 8/2004 | Dygert | |
| 2004/0239654 A1 | 12/2004 | Okuda | |
| 2006/0055465 A1 | 3/2006 | Lin et al. | |
| 2009/0195191 A1 | 8/2009 | Lim et al. | |
| 2009/0225014 A1 | 9/2009 | Ikegami | |
| 2010/0194301 A1 | 8/2010 | Okubo | |
| 2010/0219766 A1 | 9/2010 | Kuo et al. | |
| 2010/0219773 A1 | 9/2010 | Nakai | |

OTHER PUBLICATIONS

Texas Instruments, TPS61300, TPS61301, TPS61305 "1.5A/4.1A Multiple LED Camera Flash Driver with I2C Compatible Interface," 2010 Texas Instruments, Dallas, Texas. pp. 78.

* cited by examiner

*Primary Examiner* — David H Vu

(57) ABSTRACT

Various embodiments relate to a method for driving a light emitting diode (LED) flash including: measuring a junction temperature of the LED by applying a test current to the LED and measuring the LED forward voltage; determining the drive current based upon the measured junction temperature and measured data characteristics of the LED; and applying the drive current to the LED for a specified length of time.

13 Claims, 7 Drawing Sheets

METHOD OF POWER AND TEMPERATURE CONTROL FOR HIGH BRIGHTNESS LIGHT EMITTING DIODES

The present patent application claims priority to U.S. Provisional Patent Application No. 61/486,202, filed May 13, 2011 which is incorporated herein for all purposes.

TECHNICAL FIELD

Various exemplary embodiments disclosed herein relate generally to a method of power and temperature control for high brightness light emitting diodes.

BACKGROUND

Light emitting diodes (LEDs) are used as flash light sources for cameras, especially cameras found on multifunction portable devices. The LEDs may include High Brightness LEDs (HBLEDs) that provide a bright light source especially beneficial for photography.

Maximizing both the lifetime and luminous flux output of the LED requires balancing the competing characteristics of high current for higher luminous flux and less current for lower LED junction temperature. LEDs have a maximum junction temperature that results in a specific lifetime. Accordingly, this maximum junction temperature leads to the current, voltage, and on time that may be used to operate the LED. The LED printed circuit board mounting in part determines the thermal resistance of the LED junction to ambient temperature. The composite thermal resistance then translates the applied power, i.e., electrical applied power minus optical power emitted, into a LED junction temperature.

The applied power is equivalent to the LED forward voltage multiplied by the operating current. The power that is translated into heat is that portion of the applied power that is not converted to emitted light.

For a given large sample size of LEDs, the LEDs exhibit large varying forward voltages for identical operating currents. Consequently, the junction temperature for the LEDs will be substantially different. Even if all LEDs exhibited the same forward voltage and were operated using the same currents, the junction temperature at the end of a flash period may still be different. There are several reasons for this.

One source of difference is the difference in optical efficiency between LEDs when converting applied power to luminous flux. A second cause of the temperature difference is the difference in thermal resistance for different mounted LEDs. A third cause results from the starting junction temperature being different at the start of any given operation period. And a fourth cause is a result of LED aging whereby the luminous flux output (optical power emitted) for a fixed operating current lowers with lifetime.

Of the four causes listed above, optical efficiency and aging can generally be ignored in flash applications. This is a result of the LED manufacturers binning their devices for matching luminous flux (i.e., optical efficiency) and the small operational lifetime of the installed LED (e.g., smartphone replacement cycle is substantially shorter than LED lifetime).

Variations in thermal resistance are dominated by the variations in the case to ambient thermal resistance because this term is the largest. Luckily, the composite thermal resistance is substantially constant and exhibits a variation of perhaps ±/−5%.

Therefore, junction temperature variation is predominantly a function of variations in forward voltage and starting junction temperature.

Ignoring the variations in LED forward voltage, which can easily be +/−30%, the starting junction temperature can be the most variable cause of LED maximum junction temperature. This is a result of the large ambiguity in starting temperature at the beginning of a flash cycle. For example, a smartphone ambient temperature may be from 0° C. to 50° C. and higher, and if the LED is operated several times in succession, the average junction temperature begins to rise even higher than that of the ambient. These situations may collapse an initial and controlled factory temperature span of 125° C. (i.e., from 25° C. to 150° C. LED junction temperature) to an operational field span of 65° C. (i.e., 85° C. to 150° C. LED junction temperature).

Further, because of the wide variations in forward voltage across LEDs, designers may use a 50% design margin in order to prevent the LED junction from overheating and thus damaging the LED. This results in reduced LED output and performance.

SUMMARY

Accordingly, there is a need for a LED current drive method that maximizes the LED luminous flux output while maintaining a LED junction temperature that maximizes the LED lifetime over all possible ambient operating temperatures and for all values of production LED forward voltages.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may also relate to a method for driving a light emitting diode (LED) flash including: measuring a junction temperature of the LED by applying a test current to the LED and measuring the LED forward voltage; determining the drive current based upon the measured junction temperature and measured data characteristics of the LED; and applying the drive current to the LED for a specified length of time.

Various embodiments may also relate to a light emitting diode (LED) control circuit that controls the driving of a LED flash, including: a processor; a memory coupled to the processor that stores measured data characteristics of the LED; an communication interface coupled to the processor that receives measured data characteristics of the LED; a voltage detector that measures the forward voltage on the LED; and a current generator that supplies current to the LED, wherein the processor is configured to control the current generator to drive the LED based upon the measured forward voltage on the LED and the measured data characteristics of the LED so that the LED junction temperature is less than a maximum LED junction temperature.

Various embodiments may also relate to a method for characterizing a nominal light emitting diode (LED) for flash applications including: setting a LED junction temperature to a desired maximum junction temperature; applying a test operating current to the LED; measuring and recording the LED forward voltage; setting the junction temperature to a desired test environment junction temperature; applying an operating current to LED and measuring the forward voltage on the LED until the measured voltage reaches the recorded voltage; determining the time that the operating current was applied to the LED; and recording the determined time as the maximum on time of the LED.

Various embodiments may also relate to a method for calibrating a light emitting diode (LED) flash including: setting the junction temperature to a desired test environment junction temperature; applying a test current to the LED; measuring and recording the nominal forward voltage on the LED; applying an operating current to the LED; measuring the LED forward voltage; determining a scale factor based upon the ratio of a nominal forward voltage to the measured LED forward voltage; changing the applied operating current by the scale factor; further applying the operating current to the LED until a maximum LED on time has elapsed; applying the nominal operating current to the LED; and measuring and recording the operating LED forward voltage.

BRIEF DESCRIPTION OF THE DRAWINGS

In order to better understand various exemplary embodiments, reference is made to the accompanying drawings wherein.

DETAILED DESCRIPTION

Figure 1:
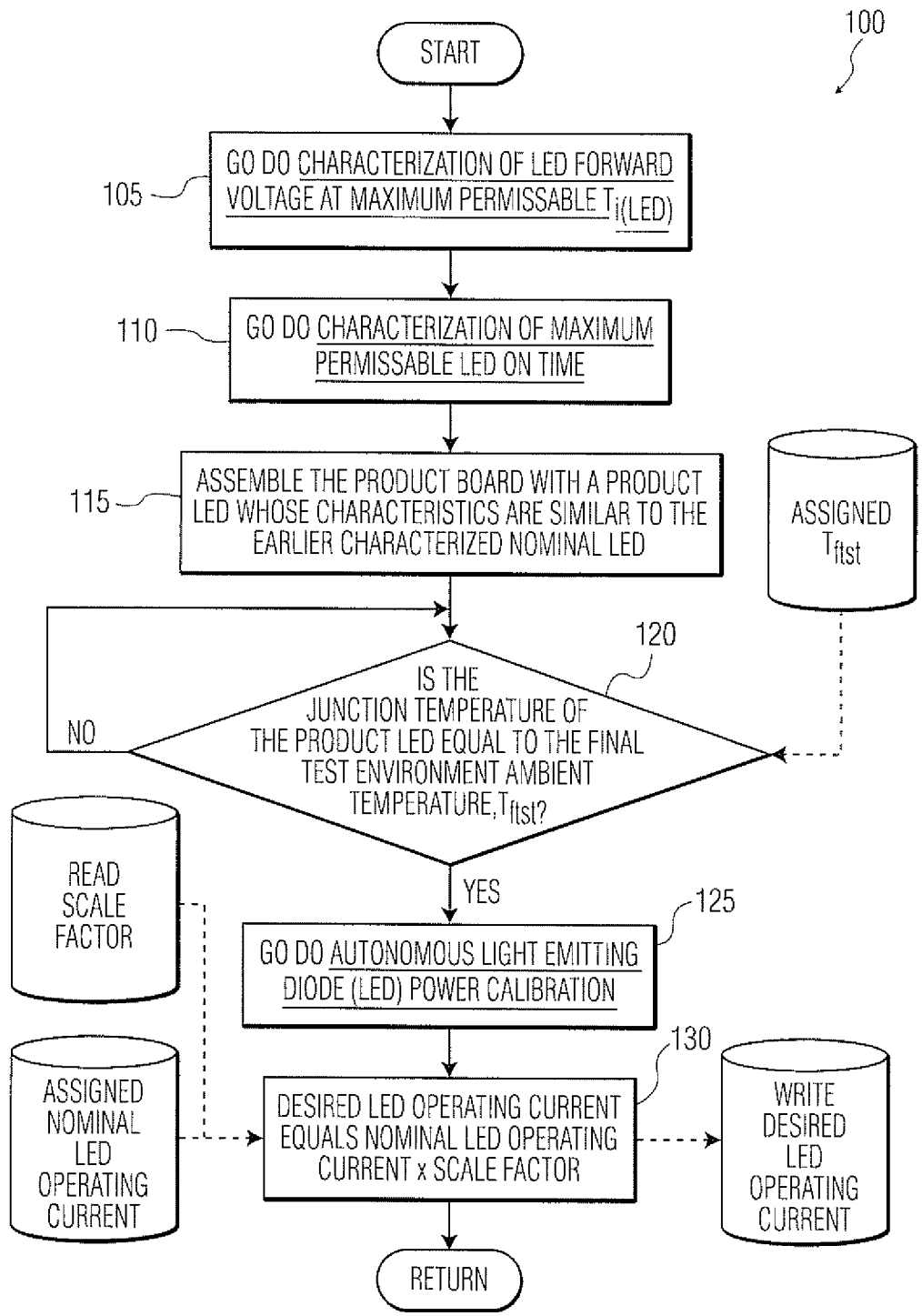
FIG. 1 is a block diagram showing a method for in situ light emitting diode calibration.

Referring now to the drawings, in which like numerals refer to like components or steps, there are disclosed broad aspects of various exemplary embodiments.

Because using a large design margin in designing a LED controller does not allow for maximum LED output, an embodiment is presented that allows for the maximum LED output without exceeding the maximum LED junction temperature as determined by the required operational lifetime of the LED. This can be done by characterizing a nominal LED that is characteristically similar to a much larger group of LEDs and storing information indicating to these characteristics. During the operation of the LED, the junction temperature may be determined, and using the stored information indicating the LED characteristics, the maximum LED current may be determined that does not cause the LED junction temperature to exceed a designed maximum junction temperature. Accordingly, the maximum optical output may be obtained without exceeding the maximum junction temperature.

FIG. 1 is a block diagram showing a method for in situ light emitting diode calibration 100. The method 100 begins by performing a characterization of the nominal LED forward voltage at the maximum permissible junction temperature 105. Next the method 100 performs a characterization of the maximum permissible on time for the nominal LED 110. The method 100 continues by assembling the product board with an LED whose characteristics are similar to the earlier characterized nominal LED 115. At this point, the similar LED is placed in the final test environment, and the method waits until the junction temperature is equal to the ambient temperature in the test environment 120. Then the method 100 performs the light emitting diode power calibration 125. Finally, the desired LED operating current is calculated 130.

The desired LED operating current is equal to the nominal LED operating current times a scale factor calculated during the autonomous LED power calibration 125.

Figure 2:
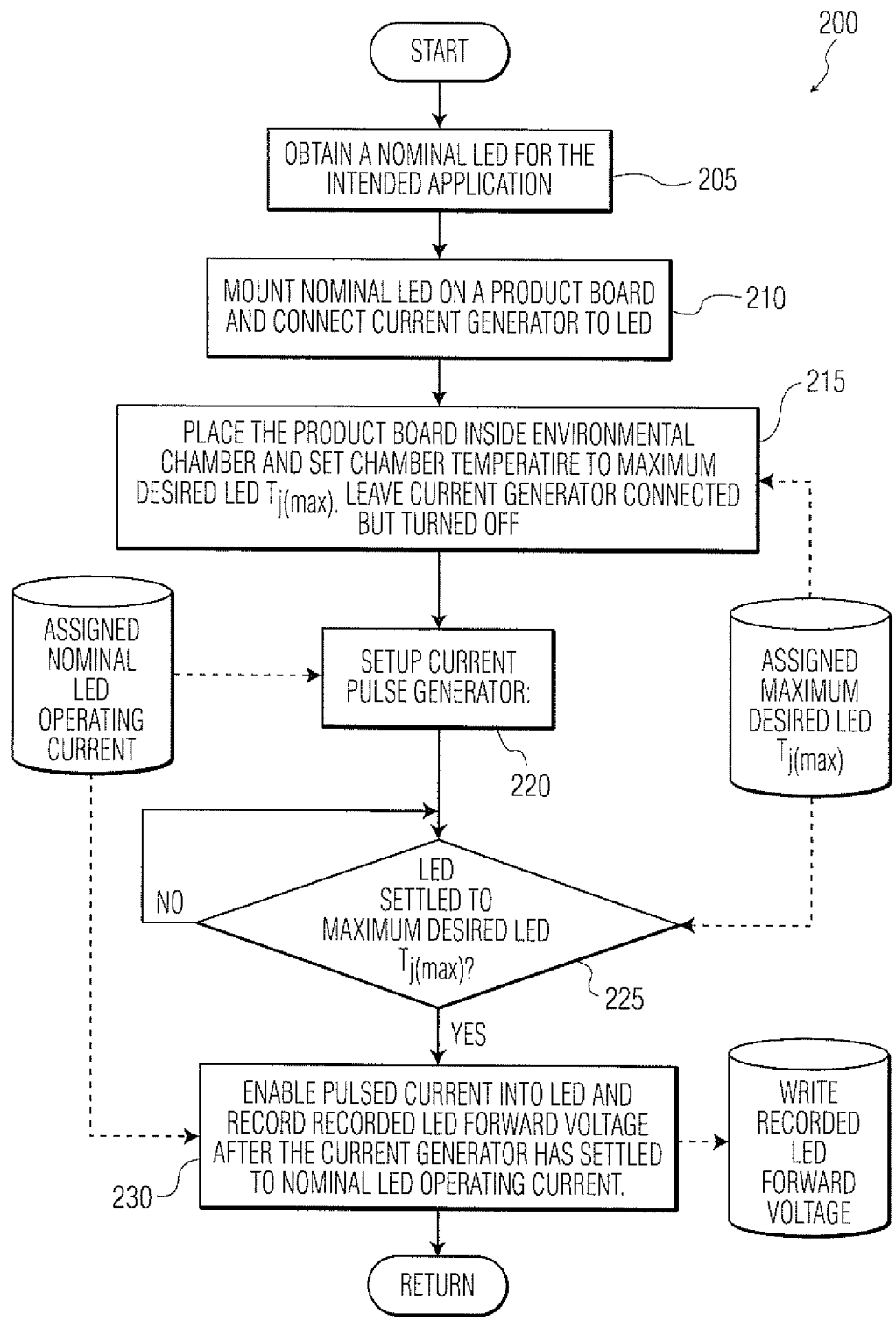
FIG. 2 illustrates is a block diagram of a method for characterizing an LED forward voltage for a maximum permissible junction temperature.

FIG. 2 is a block diagram of a method for characterizing an LED forward voltage for a maximum permissible junction temperature 200. This method is performed on a nominal LED mounted on a product board that may provide data to later be used to further calibrate and characterize production LEDs. The purpose of this method is to determine the LED forward voltage that results when a nominal LED operating current is applied when the LED junction temperature is at the desired maximum value. This method may be carried out by or under the direction of the manufacturer of the LED system.

The method 200 begins by obtaining a nominal LED for the intended application 205. Next, the nominal LED may be mounted on a product board connected to a current generator 210. The product board with the LED may then be placed inside an environmental chamber, and the temperature of the chamber may be set to the maximum desired LED junction temperature 215. Next the pulse generator may be setup 220. First, the current amplitude may be set to a nominal LED operating current. Second, the current generator on time may be set to be substantially less than the thermal time constant of the LED junction attached to the product board. Once the current generator is set up, the method allows the LED junction temperature to settle to the maximum desired LED temperature 225. Once the LED junction temperature is settled, the current generator may then be enabled to apply the nominal LED operating current to the LED 230. Once the current generator has settled to the nominal LED operating current, the LED forward voltage may be measured and stored 230. Then the method 200 ends.

Figure 3:
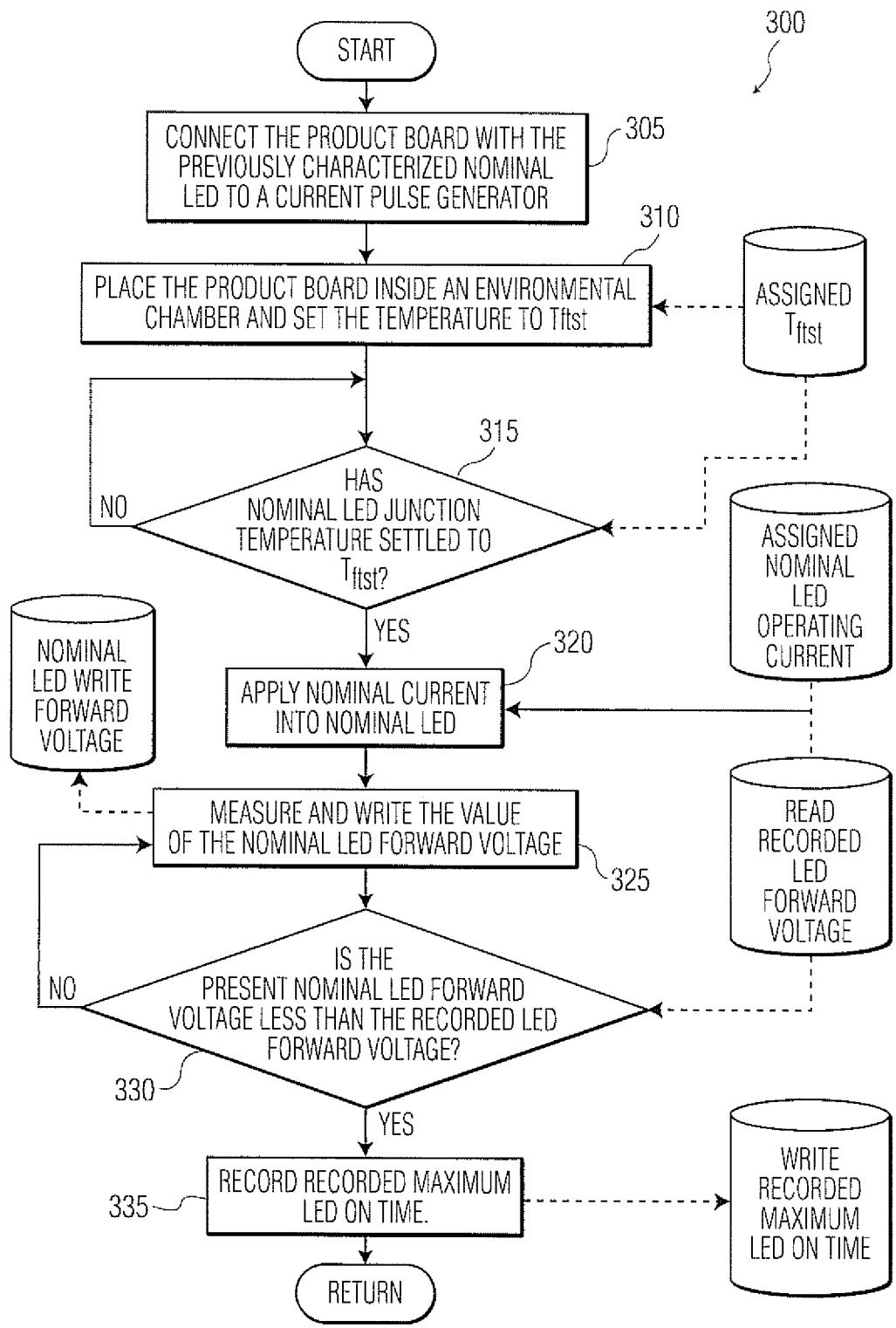
FIG. 3 is a block diagram of a method for characterizing the maximum permissible LED on time.

FIG. 3 is a block diagram of a method for characterizing the maximum permissible LED on time 300. This method follows the method 200 and may also be performed on the nominal LED mounted on the product board. The method 300 may provide data to later be used to further calibrate and characterize production LEDs and serve as a system design parameter for the LED application. The purpose of this method is to determine the maximum permissible LED on time by applying the nominal LED operating current until the recorded LED forward voltage is reached. When the recorded LED forward voltage is reached, the LED junction temperature is at the maximum desired LED junction temperature. This method may be carried out by or under the direction of the manufacturer of the LED system.

The method 300 may begin by connecting the product board with the previously characterized nominal LED to a current generator 305. Next, the product board with the LED may then be placed inside an environmental chamber, and the temperature of the chamber may be set to the temperature $T_{fst}$ 215. $T_{fst}$ is temperature that the product board will experience when it is first powered after final assembly. Next, the current generator may be setup and enabled 220. First, the current amplitude may be set to a nominal LED operating current. Second, the current generator may be set to turn off automatically when the forward voltage of the nominal LED equals the recorded LED forward voltage. Next the method 300, may measure and write the value of the nominal LED forward voltage at $T_{fst}$ 325. Then the method 300 may determine if the measured nominal LED forward voltage is equal to the recorded LED forward voltage, the forward voltage that corresponds to the maximum permissible LED junction temperature 330. If not, the method 300 may return to step 325. If so, the maximum LED on time is determined and recorded 335.

Figure 4A:
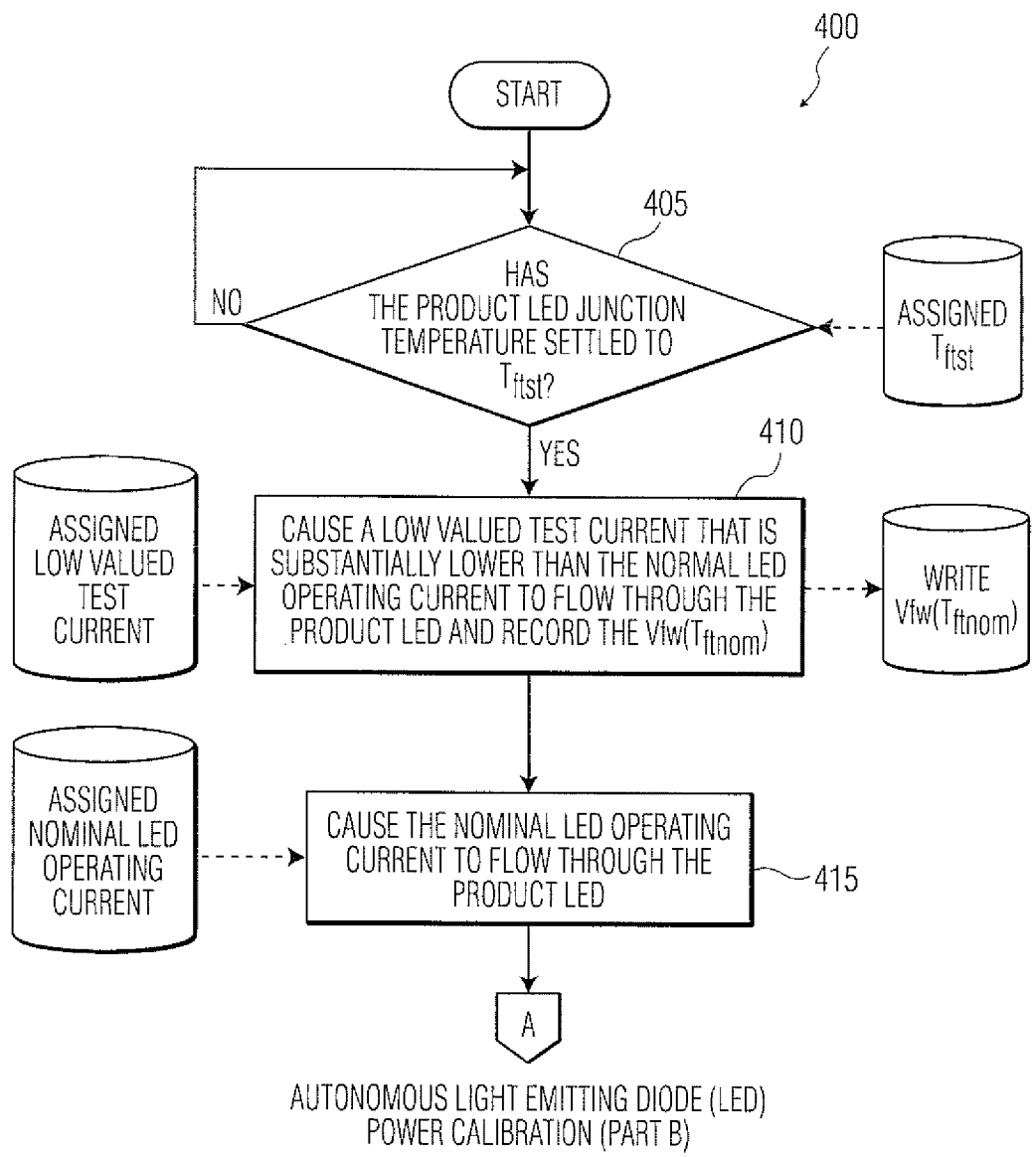
FIGS. 4A and 4B are a flow diagram illustrating a method for the autonomous power calibration of the LED.
Figure 4B:
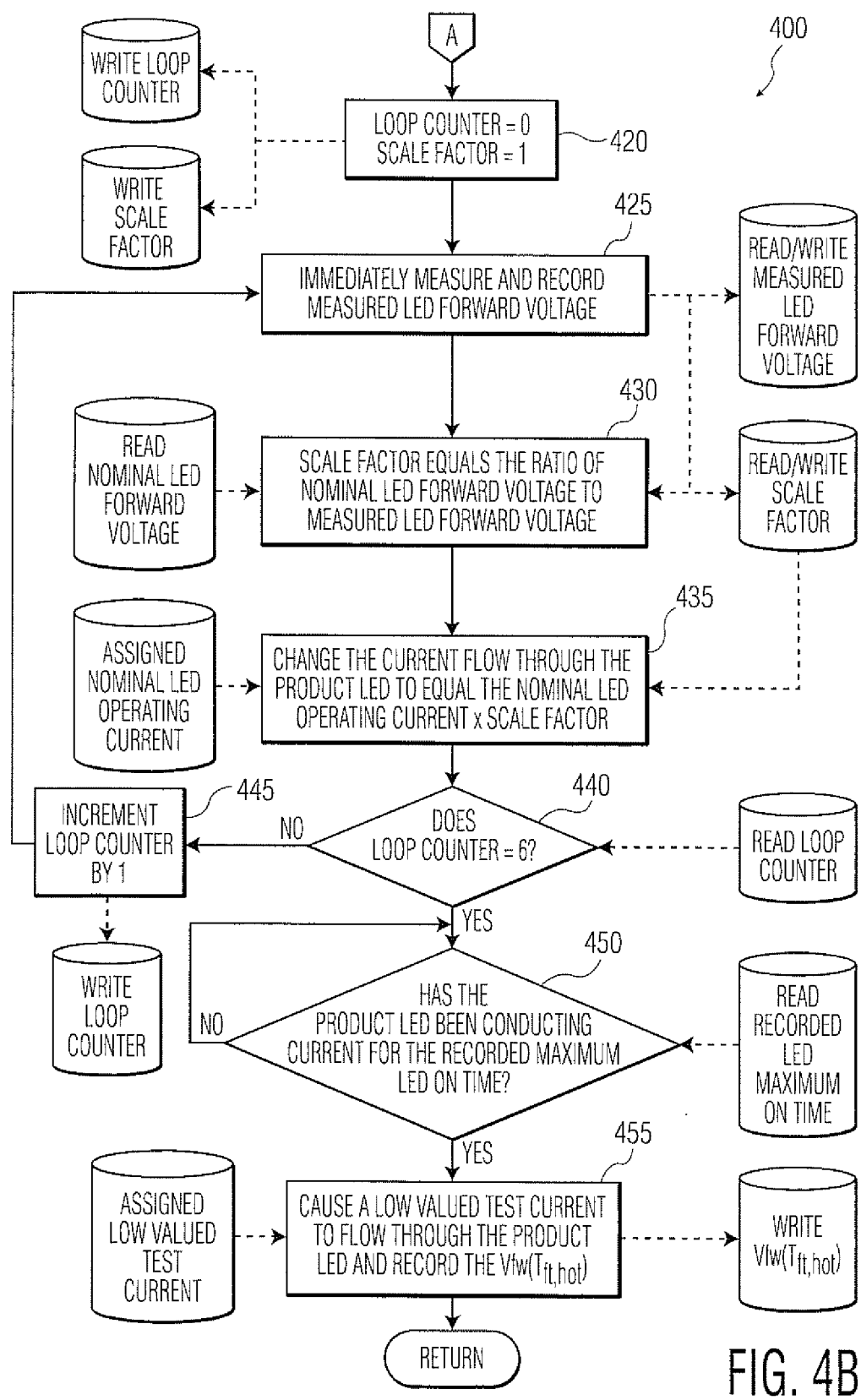

FIGS. 4A and 4B are a flow diagram illustrating a method for the autonomous power calibration of the LED. This method is performed for each LED that is used in a product. The purpose of this method is to specifically characterize each production LED mounted on a product board. The previously measured nominal operating current may be used in this method. The method may determine the specific LED forward voltages that result when a test current is applied at both temperature $T_{ftst}$ and the maximum desired LED junction temperature. These measured forward voltages may then be used to determine the LED junction temperature during operation of the LED. Further, although not strictly necessary, the method 400 uses an iterative method to determine a scale factor for the LED, where the scale factor may be used to scale the nominal operating current previously measured for the nominal LED. This allows the operating current for each operating LED to be individually determined. This allows for the maximum amount of optical output to be obtained from the LED without exceeding the desired maximum LED junction temperature. This method may be carried out by or under the direction of the manufacturer of the LED system although more likely as part of an autonomous controller 600.

Specifically the method 400 is a method for calibrating an LED that may be used in a product, and the method 400 may be performed on each product LED. The method 400 starts by applying the nominal LED operating current to the product LED, and then measuring the resulting LED forward voltage. Then the operating current may be adjusted based upon the measured LED forward voltage, and the process may be repeated. After a predetermined number of iterations, the final operating current may be stored in memory associated with the LED.

First, the product LED may be placed in an environment with a temperature $T_{ftst}$, a nominal room ambient temperature typically found in a manufacturing environment, Then the method 400 may determine if the product LED junction temperature has settled to $T_{ftst}$ 405. This would normally occur automatically as a result of the LED assembly being subjected to a nominal room ambient during assembly. Next, the method 400 may apply a test current to the LED and may measure and record the forward voltage $Vfw(T_{ftnom})$ on the LED 410. The method 400 may then apply a current with a value equal to the nominal LED operating current 415. In FIG. 4B, the loop counter and scale factor values are initiated 420. Next, the method 400 may measure and record the LED forward voltage 425. The method 400 may then calculate a scale factor 430. The scale factor may be equal to a ratio of the nominal LED forward voltage to the measured LED forward voltage 430. Next, the operating current flowing through the LED may be updated by multiplying the operating current by the scale factor 435. The method 400 then may check the loop count to determine if the total number of iterations of the loop have been completed 440. While a count of 6 is shown in 440, any other number of iterations may be used as well. If not, the loop counter may be incremented 445. The total number of iterations could include no iterations up to several iterations depending upon the precision required to determine the scale factor. Then the method 440 returns to step 425 and may measure and record the LED forward voltage 425, and the loop process repeats. If the total number of iteration of the loop have been completed, the method 400 next determines if the product LED has been on for the recorded maximum LED on time 450. Once the maximum LED on time is reached, the test current is applied to the product LED and the forward voltage $Vfw(T_{fthot})$ may be measured and recorded 455. Next, the method 400 ends.

Figure 5:
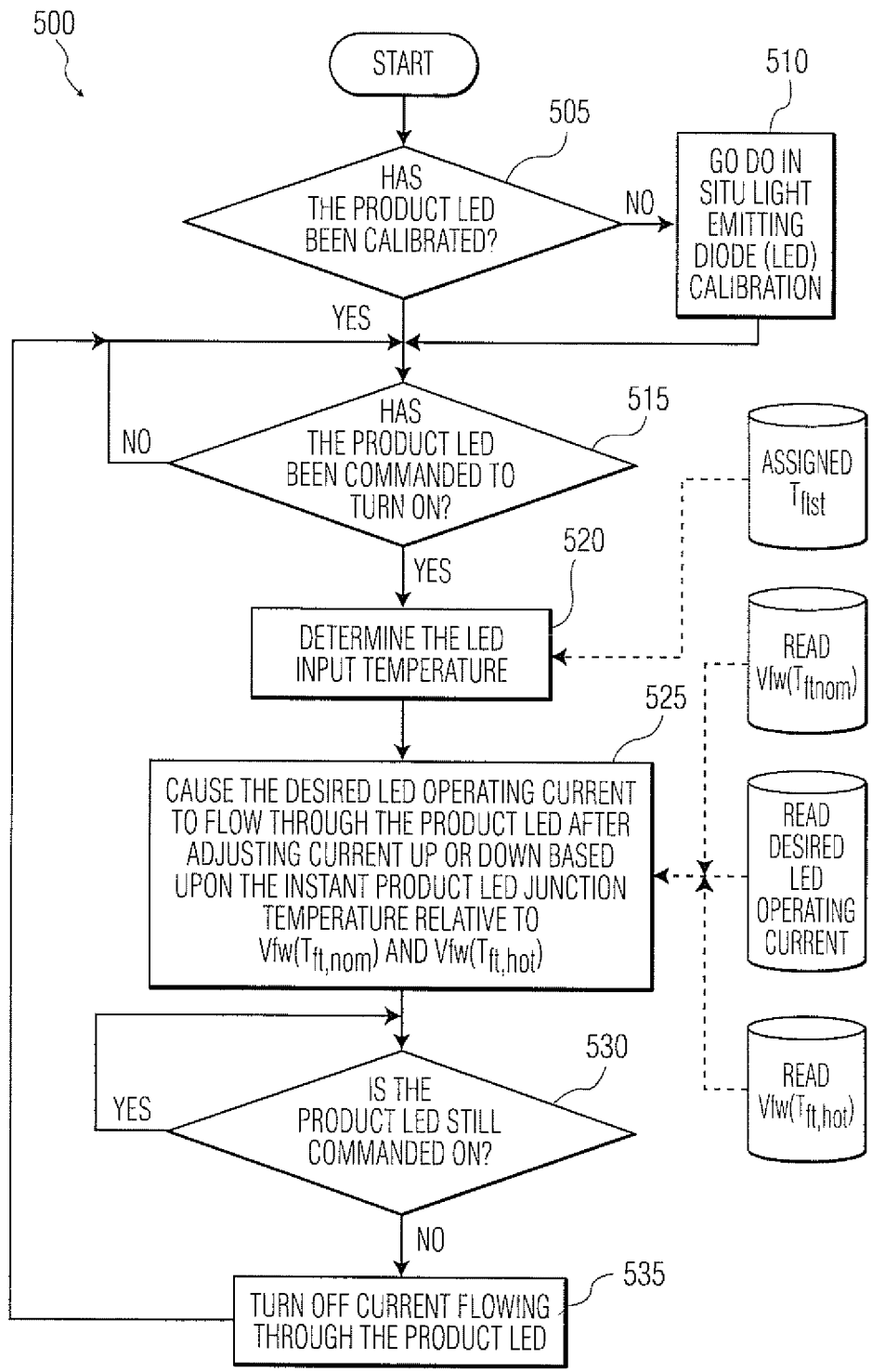
FIG. 5 is a flow diagram illustrating a method for the autonomous light emitting diode on cycle.

FIG. 5 is a flow diagram illustrating a method for the autonomous light emitting diode on cycle. This method is performed by the production LED system during the operation of the LED. This method uses data that characterizes the nominal LED as well as data that specifically characterizes the production LED. These data are used to drive the LED to obtain maximum optical output without exceeding the maximum desired LED junction temperature.

The method 500 may begin by determining if the LED is calibrated 505. If the LED has not been calibrated, a method for calibrating the LED may be carried out 510. Once the LED has been calibrated, the method may proceed to determine if the LED has been commanded to turn on 515. If not, the method 500 may cycle back to again determine if the LED has been commanded to turn on. If the LED has been commanded to turn on, the method may determine the LED junction temperature 520.

The present LED junction temperature may be determined by applying the nominal test current to the LED and measuring the resulting forward voltage. Because the LED has a linear relationship between junction temperature and forward voltage for a given input current, the LED junction temperature may be determined based upon the known characteristics of LED. These characteristics were determined in the methods 200, 300, and 400 and would normally have been previously stored in the memory of a controller 600. Thus during the operation of the LED, the test current is applied to the LED, the junction temperature may be determined from the measured forward voltage. Determining the current LED junction temperature may include using a lookup table or performing a linear calculation.

Next, the method 500 may determine the desired LED operating current based upon the measured LED junction temperature and the previously determined the LED characteristics 525. This determination may be done using a lookup table or performing a calculation based upon the LED characterization data previously determined. As a result the actual operating current may be scaled up or down from the nominal operating current for the LED. Next, the method 500 determines if the product LED has been on for the maximum LED on time 530, 535. If so, the method 500 turns off the current to the LED and returns to step 515.

Figure 6:
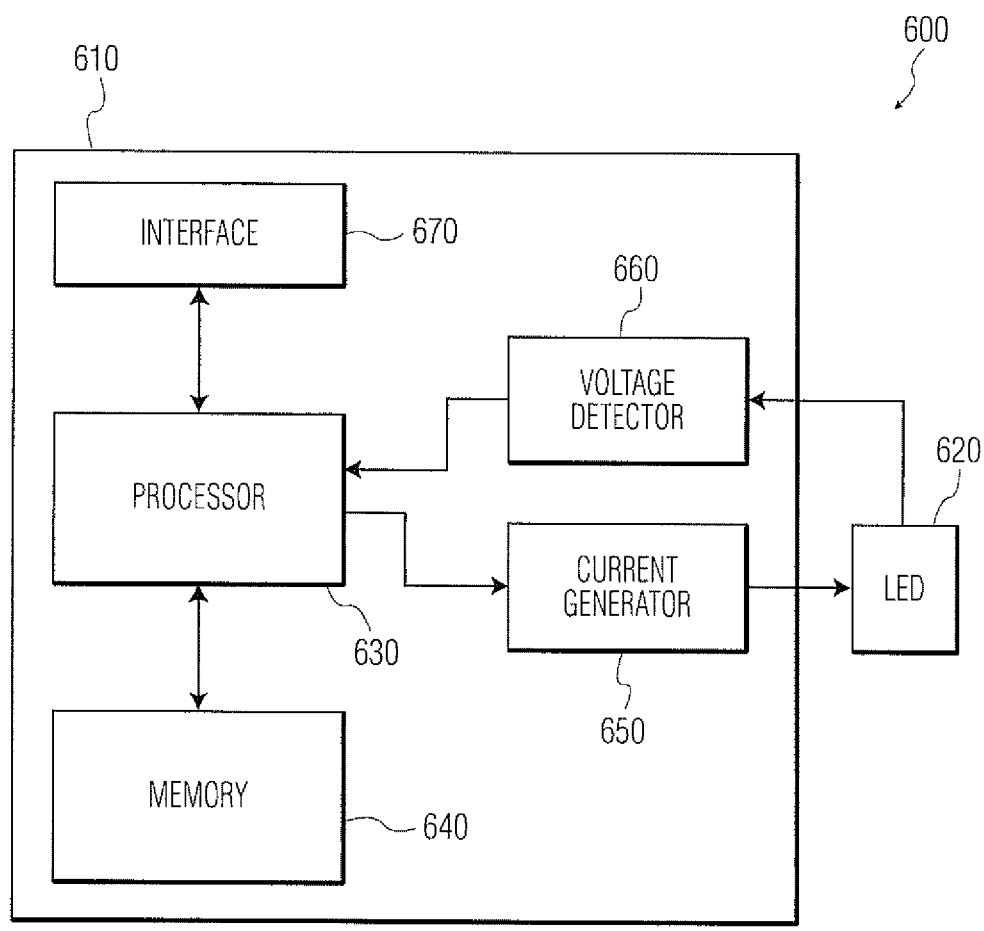
FIG. 6 is a block diagram showing an LED control system.

FIG. 6 is a block diagram showing an LED control system. The LED system 600 may include an LED controller 610 and an LED 620. The LED controller 610 and LED 620 may be mounted on a product board (not shown).

The LED controller 610 may include a processor 630, a memory 640, a current generator 650, a voltage detector 660, and a communication interface 670. The processor may be any type of processor that may control the overall operation of the LED controller 610. It may be a microprocessor, a microcontroller, an application specific integrated circuit, etc. The communication interface 670 may be coupled to the processor 630 to allow the processor 630 to receive and transmit data with external test equipment during LED characterization and/or with other systems in the product. The memory 640 may store various data related to the characterization of the LED as well as other necessary code and information that the processor 630 may require in order to operate. The voltage detector 660 may detect the forward voltage on the LED 620 and may provide the measured voltage to the processor 630. The current generator 650 may provide current to drive the LED 620 under the control of the processor 630.

The LED controller 610 helps to carry out parts of the methods 100, 200, 300, and 400 in conjunction with various test equipment. Further, the LED controller 610 may carry out all or part of the method 500 to operate the LED 620 when a product incorporating the LED 620 is in use. The processor 630 may receive various measured data during the calibration processes and store that data in the memory 640. During the operation of the LED, the processor 630 may use the stored measured data along with the measured forward voltage on the LED 620 to control the current source 650 to drive the LED. This may be accomplished by performing the method 500.

The LED controller 610 may include various chips on a printed circuit board or may be a completely integrated circuit that may include all or just some of the elements of the LED controller 610.

It should be appreciated by those skilled in the art that any block diagrams herein represent conceptual views of illustrative circuitry embodying the principles of the invention. Similarly, it will be appreciated that any state transition diagrams, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method for driving a light emitting diode (LED) flash comprising:
   measuring a junction temperature of the LED by applying a test current to the LED and measuring the LED forward voltage;
   determining the drive current based upon the measured junction temperature and measured data characteristics of the LED; and
   applying the drive current to the LED for a specified length of time.

2. The method of claim 1, wherein measurement data characteristics of the LED include a LED operating current, a forward LED voltage at a nominal junction temperature, and a forward LED voltage at a maximum junction temperature.

3. The method of claim 2, wherein measuring the junction temperature of the LED includes calculating the junction temperature based upon the measured forward voltage, the forward LED voltage at a nominal junction temperature, and the forward LED voltage at a maximum junction temperature.

4. The method of claim 1, wherein determining the drive current includes calculating a scale factor based upon the measured junction temperature and measured data characteristics of the LED and multiplying a predetermined nominal current by the scale factor.

5. A light emitting diode (LED) control circuit that controls the driving of an LED flash, comprising:
   a processor;
   a memory coupled to the processor that stores measured data characteristics of the LED;
   a communication interface coupled to the processor that receives measured data characteristics of the LED;
   a voltage detector that measures the forward voltage on the LED; and
   a current generator that supplies current to the LED,
   wherein the processor is configured to control the current generator to drive the LED based upon the measured forward voltage on the LED and the measured data characteristics of the LED so that the LED junction temperature is less than a maximum LED junction temperature.

6. The LED control circuit of claim 5, wherein measurement data characteristics of the LED include a LED operating current, a forward LED voltage at a nominal junction temperature, and a forward LED voltage at the maximum junction temperature.

7. The LED control circuit of claim 5, wherein processor is configured to determine the temperature of the LED junction based upon the forward voltage on the LED measured by the voltage detector when the current drive applies a test current to the LED.

8. The LED control circuit of claim 5, wherein processor is configured to determine a drive current by calculating a scale factor based upon the measured junction temperature and measured data characteristics of the LED and multiplying a predetermined nominal current by the scale factor.

9. A method for characterizing a nominal light emitting diode (LED) flash comprising:
   setting a LED junction temperature to a desired maximum junction temperature;
   applying a test operating current to the LED;
   measuring and recording the LED forward voltage;
   setting the junction temperature to a desired test environment junction temperature;
   applying an operating current to LED and measuring the forward voltage on the LED until the measured voltage reaches the recorded voltage;
   determining the time that the operating current was applied to the LED; and
   recording the determined time as the maximum on time of the LED.

10. The method of claim 9, further comprising transmitting the recorded junction temperature and the maximum on time to an LED controller.

11. A method for calibrating a light emitting diode (LED) flash comprising:
   setting the junction temperature to a desired test environment junction temperature;
   applying a test current to the LED;
   measuring and recording the nominal forward voltage on the LED;
   applying an operating current to the LED;
   measuring the LED forward voltage;
   determining a scale factor based upon the ratio of a nominal forward voltage to the measured LED forward voltage;
   changing the applied operating current by the scale factor;
   further applying the operating current to the LED until a maximum LED on time has elapsed;
   applying the nominal operating current to the LED; and
   measuring and recording the operating LED forward voltage.

12. The method of claim 11, further comprising repeating for a specified number of the iterations the steps of measuring the LED forward voltage, determining a scale factor, and changing the applied operating current by the scale factor.

13. The method of claim 11, where the number of iterations is selected such that the time to complete the iterations is less than the maximum LED on time.

* * * * *